United States Patent
Grasso et al.

(10) Patent No.: US 10,183,652 B2
(45) Date of Patent: Jan. 22, 2019

(54) ASSEMBLY FOR PRODUCING A MOTOR VEHICLE WINDSCREEN WIPING SYSTEM AND CONNECTION DEVICE INCLUDING SUCH AN ASSEMBLY

(71) Applicant: Valeo Systèmes d'Essuyage, Le Mesnil Saint Denis (FR)

(72) Inventors: Guiseppe Grasso, Le Breuil sur Couze (FR); Denis Thebault, Clermont Ferrand (FR); Philippe Daumas, Corent (FR); Patrice Guilhot, Chidrac (FR)

(73) Assignee: Valeo Systàmes d'Essuyage, Le Mesnil Saint Denis (FR)

( * ) Notice: Subject to any disclaimer, the term of this patent is extended or adjusted under 35 U.S.C. 154(b) by 458 days.

(21) Appl. No.: 14/276,642

(22) Filed: May 13, 2014

(65) Prior Publication Data

US 2014/0331437 A1    Nov. 13, 2014

(30) Foreign Application Priority Data

May 13, 2013  (FR) ...................... 13 54272

(51) Int. Cl.
*B60S 1/40*   (2006.01)
*B60S 1/38*   (2006.01)

(52) U.S. Cl.
CPC .......... *B60S 1/4038* (2013.01); *B60S 1/3862* (2013.01); *B60S 1/4045* (2013.01); *B60S 1/4048* (2013.01); *B60S 1/3805* (2013.01); *B60S 1/3808* (2013.01); *B60S 1/3868* (2013.01); *B60S 1/40* (2013.01); *B60S 2001/4051* (2013.01); *B60S 2001/4054* (2013.01)

(58) Field of Classification Search
CPC .... B60S 1/3805; B60S 1/3849; B60S 1/3862; B60S 1/4038; B60S 1/4045; B60S 1/4048; B60S 2001/4051; B60S 1/524; B60S 1/40
See application file for complete search history.

(56) References Cited

U.S. PATENT DOCUMENTS 8,549,696 B2 * 10/2013 Boland ................. B60S 1/3848
                                                       15/250.32

FOREIGN PATENT DOCUMENTS

| EP | 2460700 B1 | * | 6/2012 |
| FR | 2968257 | * | 6/2012 |
| WO | WO2010/034445 A1 | * | 4/2010 |
| WO | WO2012/072301 A1 | * | 6/2012 |

* cited by examiner

*Primary Examiner* — Gary K. Graham
(74) *Attorney, Agent, or Firm* — Osha Liang LLP

(57) ABSTRACT

The invention concerns an assembly (1) for producing a motor vehicle windscreen wiping system (3), including an end fitting (5) of a wiper arm (7) adapted to move a wiper (9) and a connection interface (11), notably a hydraulic and/or electrical connector for feeding a liquid to the wiper (9) and/or for heating the liquid or the wiper, said end fitting (5) being configured to accept an adapter (13) allowing rotation between said arm (7) and the wiper (9), said assembly (1) being adapted to occupy a working position in which said connection interface (11) is free relative to said end fitting (5) and a service position in which said connection interface (11) can be oriented relative to said end fitting (5), said end fitting (5) being configured to guide said connection interface (11) in the working position and in the service position.

14 Claims, 5 Drawing Sheets

ASSEMBLY FOR PRODUCING A MOTOR VEHICLE WINDSCREEN WIPING SYSTEM AND CONNECTION DEVICE INCLUDING SUCH AN ASSEMBLY

The field of the present invention is that of equipment for vehicles and more particularly that of equipment for wiping the windows of motor vehicles.

Motor vehicles are routinely equipped with windscreen wiping systems for washing the windscreen and preventing disturbance to the driver's view of their environment. In the working position, these windscreen wipers are conventionally driven by wiper arms effecting an angular to-and-fro movement and include elongate wipers carrying wiper blades made from an elastic material. These blades rub against the windscreen and evacuate water out of the field of view of the driver. The wipers are produced in either the conventional form of articulated supporting bars that hold the wiper blade at a plurality of discrete locations or a more recent, so-called "flat blade" form of a semi-rigid assembly that holds the wiper blade over the whole of its length. In both solutions, the wiper is attached to the wiper arm by an assembly consisting of a mechanical connector and an adapter. The mechanical connector is a part that is crimped to the supporting bar or directly to the flat wiper and the adapter is an intermediate part for fixing the connector to the wiper arm. These two parts are connected to each other by a transverse shaft that allows relative rotation thereof in a plane perpendicular to the windscreen and passing through the wiper arm.

It is also known to provide vehicles with devices for feeding a windscreen washing liquid from a tank located under the bonnet and spraying it in the direction of the windscreen via nozzles located either near the windscreen or on the windscreen wiper itself for better distribution of the liquid. In the case of nozzles on the wipers, the windscreen washing liquid is fed via pipes that are fixed to the wiper arm and are connected to the wiper via a connection interface at the level of the mechanical connector. The connection interface is fixed to the mechanical connector by appropriate terminations and makes the necessary seal to it.

While the liquid pipes and the connection interface are generally connected to the wiper arm, the mechanical connector is connected to the wiper and it is necessary to connect the connection interface to the mechanical connector when changing the wiper. This operation is effected in a so-called service position.

It is necessary to ensure that the connection interface is correctly aligned during installation in the mechanical connector, failing which incorrect assembly would be reflected in a risk of the windscreen washing liquid leaking at the level of the junction of the two connectors.

Furthermore, it is important that the connection interface remains attached to the wiper arm during decoupling or demounting of the wiper relative to the wiper arm. This prevents the connection interface being entrained by the mechanical connector during the movement separating it from the wiper arm.

However, after mounting the wiper in the arm, the connection interface must not limit the necessary freedom of movement in rotation of the adapter relative to the mechanical connector, in particular when the wiping system is again in its working position.

To this end there are known windscreen wipers in which the connection interface is held in the service position by clipping it into openings in a part attached to the wiper arm. However, this necessitates an intermediate part that is relatively complex to manufacture and to assemble to the arm.

An object of the present invention is to remedy some or all of these drawbacks.

To this end, the invention consists in an assembly for producing a motor vehicle windscreen wiping system including an end fitting of a wiper arm adapted to move a wiper and a connection interface, notably a hydraulic and/or electrical connector for feeding a liquid to the wiper and/or for heating the liquid and/or the wiper, said end fitting being configured to accept an adapter allowing rotation between said arm and the wiper, said assembly being adapted to occupy a working position in which said connection interface is free relative to said end fitting and a service position in which said connection interface can be oriented relative to said end fitting.

According to the invention, the end fitting is configured to guide said connection interface in the working position and in the service position.

Accordingly, thanks to said end fitting itself, the connection interface can be oriented with its position indexed by the guidance on the arm. It can thus be locked or at least moved into the service position in the required configuration without any intermediate part. The invention also covers the situation in which the connection interface is able to assume the required orientation at the time of disconnection and/or connection of said wiper from/to the arm through cooperation with the wiper and with no intermediate part.

Said connection interface is brought to said service position by a movement of the wiper on the arm, for example, a rotation of the wiper relative to the arm, said interface being free to rotate in the working position in said arm.

The invention may employ the following features, separate or in combination:
- said connection interface includes at least one projection,
- said connection interface is made visible through the end fitting in the service position and/or in the working position, in particular by means of said projection,
- said connection interface may be abutted on the end fitting in said service position, in particular by means of said projection,
- said connection interface may be kept oriented by said end fitting, in particular by means of said projection,
- said end fitting includes a body configured with at least one window and/or deformation for cooperation with said projection in the service position and in said working position,
- said deformation of said body faces toward the interior or toward the exterior of the body,
- said body is configured to cause said projection to appear in said window in the service position and/or in said working position,
- said body is configured so that said projection is accommodated in said window and/or deformation and guides the movement of the connection interface from the working position to said service position,
- said body is configured so that said projection is received outside said deformation and guides the movement of the connection interface from the working position to said service position,
- said projection takes the form of a pin and/or rib,
- said projection is slotted,
- said projection includes two projecting elements, notably to prevent pivoting of the connection interface on the axis of one of said projecting elements, said window or deformation includes a portion in the shape of a bean, notably a portion of circular arc shape, so as to allow rotation of the wiper relative to the arm, said projection is slidably mounted in or on said window and/or deformation to allow rotation of the wiper relative to the arm, in said working position, up to an angle of the wiper relative to the arm equal to approximately plus or minus 15° from the null angle, advantageously 12° and more particularly 10° from the null angle, said window and/or deformation and said projection have complementary shapes enabling guidance thereof relative to each other in the service and/or working position, said window and/or deformation is on a lateral portion of the body of the end fitting, said window and/or deformation is obtained by cutting and/or pressing a wall of the body of the end fitting, said window and/or deformation includes an opening adapted to receive said projection, notably with a clipping action, and to retain it in the service position, said window and/or deformation includes a recess adapted to receive said projection and to retain it in the service position on extraction of the wiper and conversely to allow connection of the wiper and its disengagement from the recess on connection of the wiper to the arm, said recess is formed at one end of said bean-shape, notably transversely to the direction in which the bean-shape extends, at its lower end, in particular radially, said assembly includes two opposed windows and/or deformations each formed on a lateral portion of the body of the end fitting and symmetrical with each other with respect to a longitudinal median plane of the end fitting, said body is configured to receive said adapter by movement in translation along a longitudinal axis along which the end fitting extends, said body is configured to allow reversible fixing of said adapter, for example by means of a retractable locking button, on the end fitting, said end fitting is configured to allow said service position in an extreme position of the connection interface, notably at a maximum angle of the connection interface relative to the end fitting, retained by a safety part of the wiping system and adapted to prevent withdrawal of the wiper from the end fitting in the working position, said end fitting is configured to allow said service position in a position of the connection interface parallel to or close to the direction of the axis d of longitudinal extension of the end fitting, said connection interface is configured so that in the service position at least one of its terminals or spigots is received by a connection guide part of the wiping system, for example of funnel shape, said connection interface includes a hydraulic connector and/or an electrical connector, these elements being generally associated with or connected to each other.

The invention also relates to a connection device of a vehicle windscreen wiping system including said assembly as described above, a mechanical connector adapted to be fixed to said wiper to attach it to the wiper arm, said adapter being mounted in an articulated manner on said mechanical connector to allow rotation between the wiper and the arm, said adapter being further configured to be inserted in said end fitting.

Said end fitting, said adapter and/or said mechanical connector may be mutually configured to guide the mechanical connector and/or the adapter, notably in translation, in particular in a longitudinal direction, in said end fitting on insertion of one in the other. Said mechanical connector is further advantageously configured to allow hydraulic and/or electrical connection of the wiper to said connection interface.

Said mechanical connector may cooperate with the wiper arm, in particular said end fitting of the latter via said safety part, provided on the mechanical connector, to prevent removal of the wiper from the end fitting in the working position.

In the service position, when changing a wiper, the invention allows the connection interface to abut on the end fitting for an angle avoiding said safety part.

For example, said safety part is of triangular shape and articulated on the mechanical connector, upstanding facing said end fitting.

The mechanical connector may be configured to support the connection interface in the working position.

Said mechanical connector may include said connection guide part for guiding the connection interface in the required orientation relative to the end fitting.

The connection of the mechanical connector to the end fitting and consequently of the wiper to the wiper arm may be locked by means of the locking button of said adapter cooperating with an opening in the end fitting, for example.

The invention also concerns a vehicle windscreen wiping system including a wiper, a wiper arm and a connection device as described above for connecting the wiper to the wiper arm and connecting them hydraulically and/or electrically.

The invention will be better understood and other objects, details, features and advantages thereof will become more clearly apparent in the course of the following detailed explanatory description of a number of embodiments of the invention provided by way of purely illustrative and non-limiting example given with reference to the appended diagrammatic drawings.

It must be noted that the figures disclose the invention in detail and that they may of course serve to define the invention better, if necessary.

In the remainder of the description, the terms longitudinal and lateral refer to the orientation of the wiper arm on which the windscreen wiper is mounted. The longitudinal direction corresponds to the main axis of the wiper arm along which it extends while the lateral orientations correspond to concurrent straight line segments, i.e. segments that cross the longitudinal direction, notably perpendicularly to the longitudinal axis of the wiper arm. For the longitudinal directions, the term front designates the direction going from a proximal end to a distal end of the wiper arm and the term rear to the opposite direction. Furthermore, the directions referred to as upper and lower correspond to orientations perpendicular to the rotation plane of the wiper arm, the term lower including the plane of the windscreen.

Finally, identical reference numbers are used to designate identical or similar elements.

Figure 1:
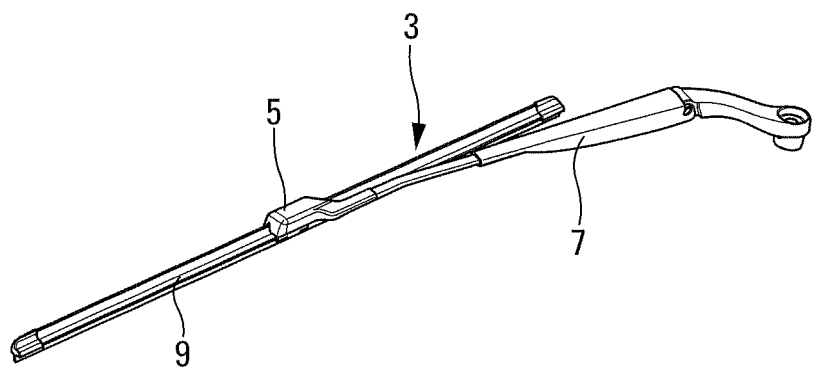
FIG. 1 is a general perspective view of a motor vehicle wiping system including a connection device in accordance with one embodiment of the invention.
Figure 2:
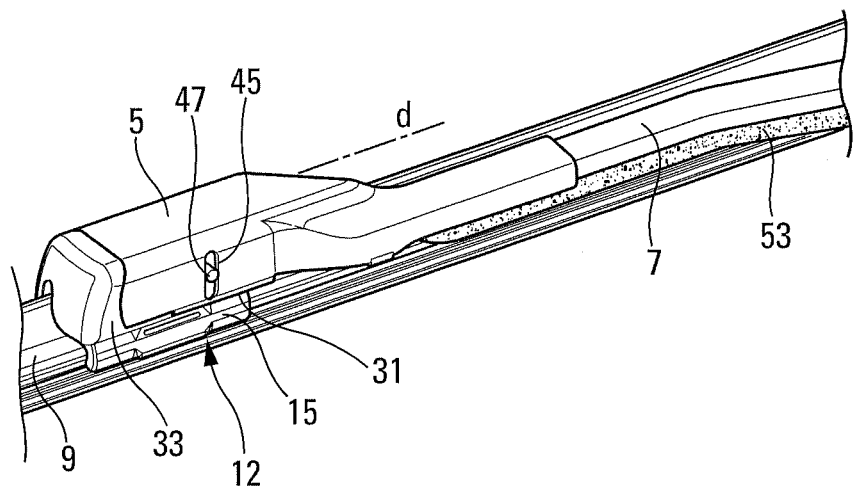
FIG. 2 is a view of a detail from FIG. 1.

As shown in FIGS. 1 and 2, the invention concerns a wiping system 3 including a wiper 9 and a wiper arm 7. The wiper 9 is a flat wiper as mentioned above, for example. Said system further includes a device 12 for connecting the wiper 9 to the arm 7 that also in itself constitutes subject matter of the invention.

Figure 6:
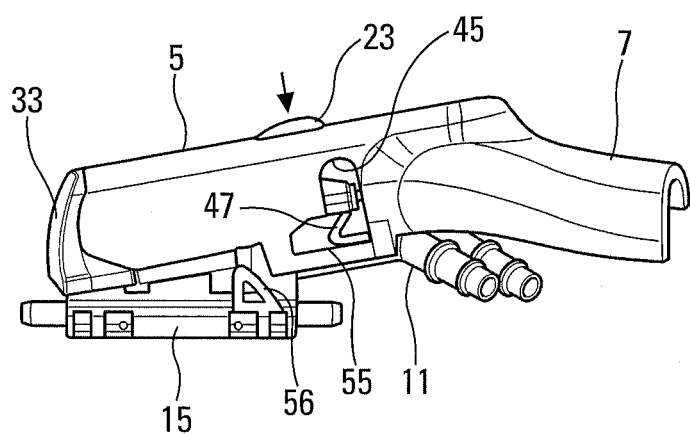
FIG. 6 is a view in elevation of a connection device of a vehicle windscreen wiping system in accordance with another embodiment of the invention in the service position.
Figure 7:
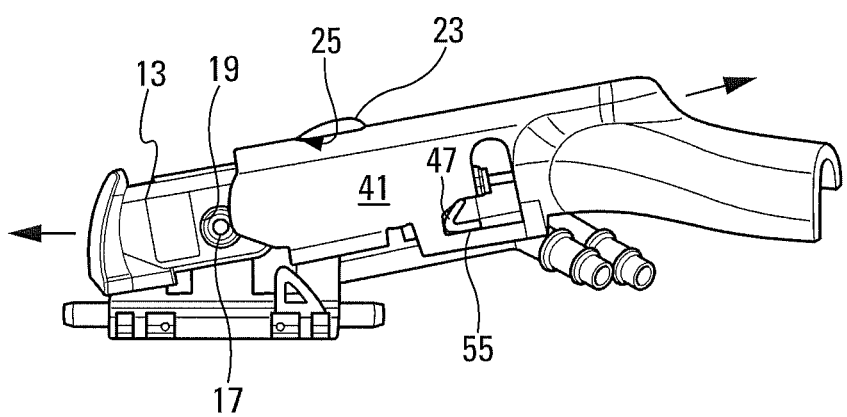
FIG. 7 is a view analogous to FIG. 6 of this connection device during disconnection.
Figure 8:
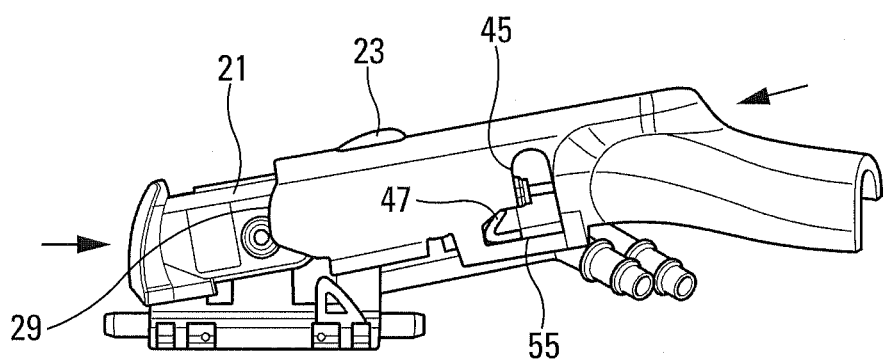
FIG. 8 is a view analogous to FIG. 6 of this connection device during connection.

As shown in FIGS. 6 to 8, the connection device 12 includes an adapter 13 and a mechanical connector 15, for example.

Said adapter 13 allows rotation between the wiper 9 and the wiper arm 7. In fact, the wiper must have at least one degree of freedom in rotation relative to the wiper arm and more specifically relative to an end fitting 5 of said arm 7, to allow the wiper to follow the curvature of the window to be wiped. Said adapter 13 is articulated on the mechanical connector 15, which to this end here includes pins 17 on its lateral flanks, said pins cooperating with orifices 19 in lateral flanks of said adapter. The mechanical connector 15 is inserted in a yoke 21 of the adapter, for example.

Here the adapter 13 is configured to be inserted in the end fitting 5 by movement in translation along a longitudinal axis d along which the end fitting 5 extends so as to come into a position of use in which it is abutted against the end fitting 5 into which it is reversibly fixed by means of a retractable locking button 23 that cooperates with a recess 25 provided for this purpose in the end fitting 5. In this position, said end fitting 5 covers the adapter 13. The retractable button 23 and/or the recess 25 are here in upper portions of said adapter 13 and said end fitting 5, respectively, said button 23 being located at the rear end of a flexible lug of the adapter. Numerous locking variants are possible.

Here the end fitting 5 has an inverted "U" shape with the opening of this "U" shape intended to face the windscreen. The yoke shape 21 of the adapter 13 is complementary to the internal volume of the end fitting 5, for example, so as to be accommodated in the latter. When the wiper 9 is placed in the wiper arm 7, the adapter is inserted in said end fitting via an opening 29 at the distal end of the latter and guided in translation in the latter by rims 31 of its lateral flanks (FIG. 2).

The adapter 13 or the mechanical connector 15 fastened to the wiper 9 may have an external wall 33, referred to as the cap, closing the front portion of the end fitting 5.

This being so, the invention also concerns an assembly for producing the wiping system 3. Said assembly includes the end fitting 5 of the arm 7 and a connection interface 11 accommodated in this end fitting 5. Here said connection interface 11 includes a hydraulic connector 37 and/or an electrical connector 39, possibly fastened to each other, also referred to hereinafter as a hydraulic and/or electrical connector. Said connection interface 11 is used to feed a liquid to the wiper 9 and/or to heat the liquid or the wiper.

The face of the adapter and/or of the mechanical connector opposite the cap 33, referred to as the inner face, faces toward said hydraulic and/or electrical connector 11.

Figure 9:
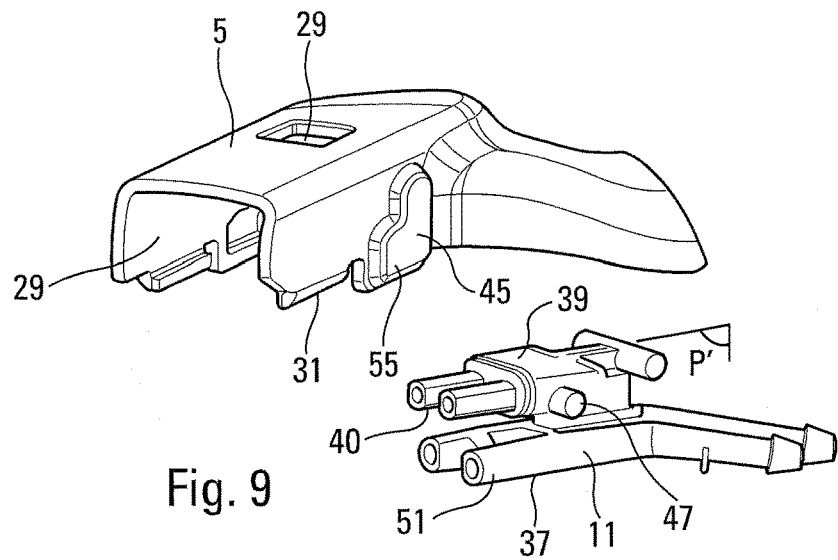
FIGS. 9, 10 and 11 are perspective views showing variants of the connection device, only an arm head and a connection interface of said device being shown.
Figure 11:
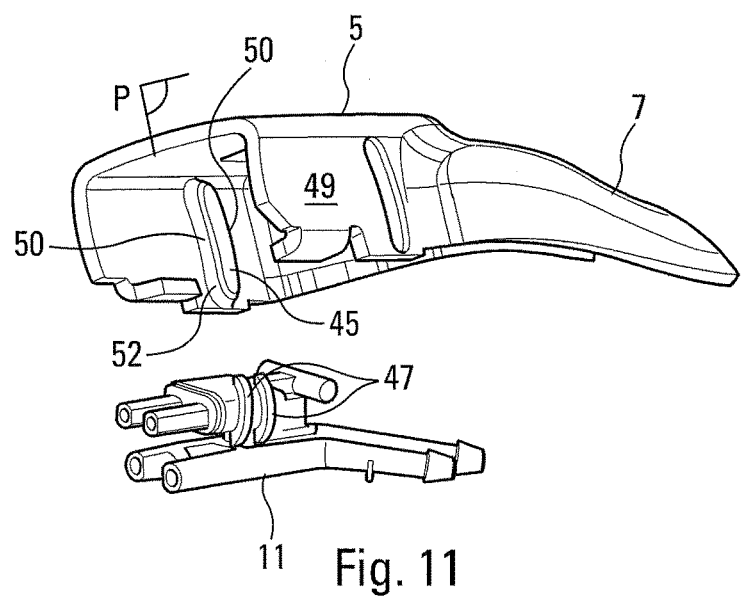

Here the mechanical connector 15 includes orifices (not visible) for connecting it to corresponding spigots 51 of the hydraulic connector 37 leading to internal passages 53 for distributing the windscreen washing liquid to the wiper and orifices for connecting terminals 40 of the electrical connector (FIGS. 9 and 11).

In the working position the connection interface 11 remains free to move and in the service position it can be oriented in the appropriate direction for mounting the wiper.

Figure 3:
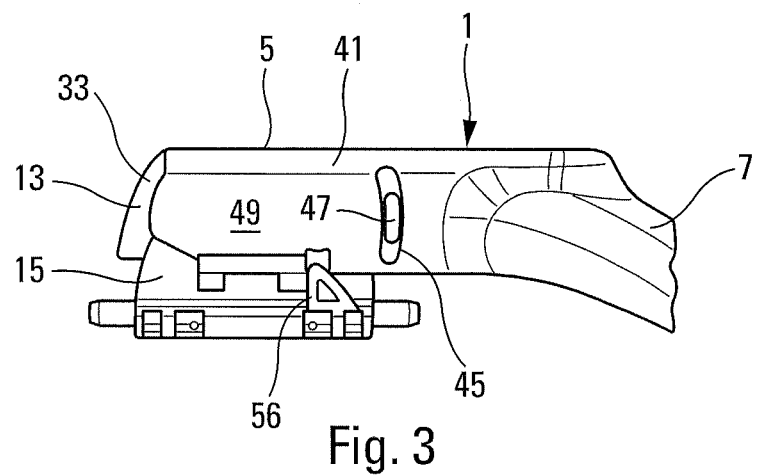
FIG. 3 is a view in elevation of a connection device of a vehicle windscreen wiping system in accordance with a first embodiment of the invention in a working position.
Figure 4:
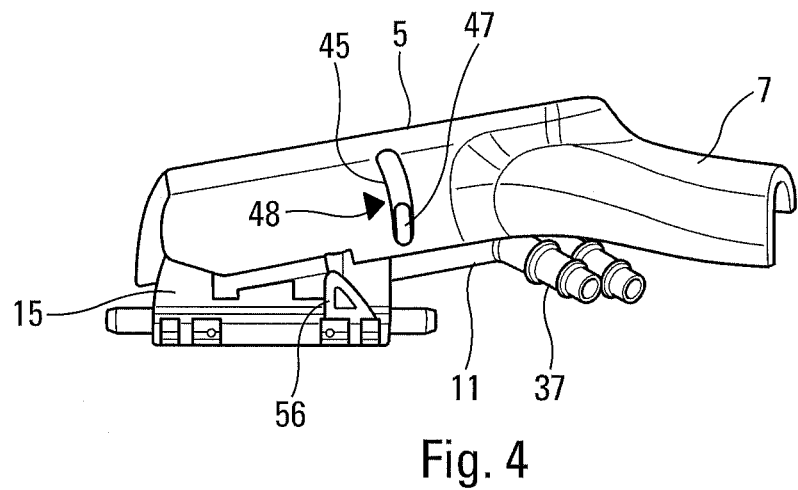
FIG. 4 is a view analogous to FIG. 3 of this connection device in a service position.
Figure 5:
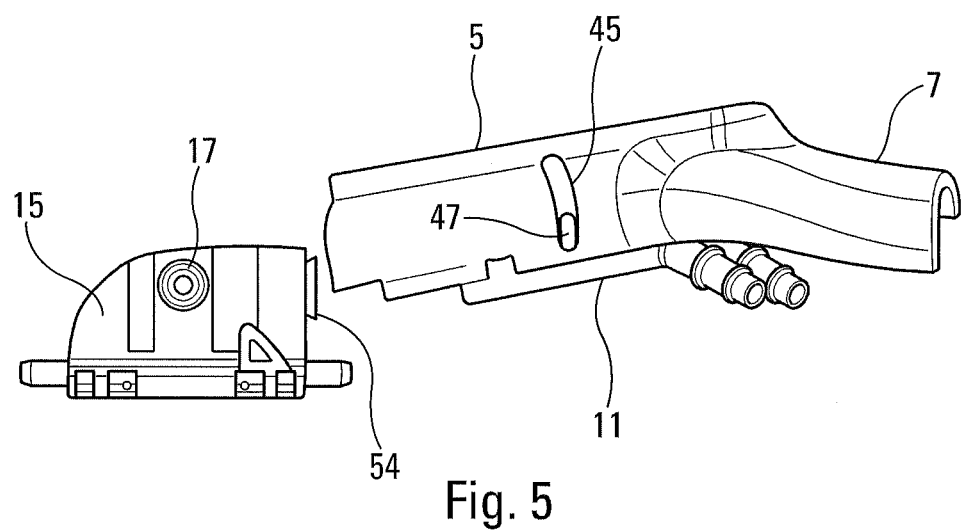
FIG. 5 is a view analogous to FIG. 3 of this connection device after demounting the connection device.

In accordance with the invention, said end fitting 5 is configured to guide said connection interface 11 in the working position, as is particularly apparent in FIG. 3, and in the service position, as seen in FIGS. 4, 5, 6. By providing such guidance, the connection interface can engage with the end fitting directly, without any intermediate part.

Moreover, said end fitting advantageously retains said connection interface in the service position when demounting the wiper, as described later.

Said end fitting 5 may in particular be configured to show or to provide at least one pin 47 of said connection interface 11 on the end fitting 5 in a service position allowing disconnection and/or connection of the connector and the arm.

Thus the hydraulic and/or electrical connector 11 may be placed in the service position on the end fitting by the user in a manner apparent to the user by virtue of the position of said pin 47, visible from the outside.

The user can identify said service position when the pin 47 in reaching said service position passes a point, for example a marker 48 on the end fitting, that indicates said service position when it reaches a particular position.

Said service position may further be identified when said pin 47 reaches a position in which it is abutted against said end fitting 5, for example at the end of an opening or window 45 in the end fitting, as seen in FIG. 4.

Said pin 47 may be made visible in said service position and in said working position as represented in FIGS. 3 and 4 in which it is visible in the window 45. Although this is not represented, the pin may be visible only in the service position, for example in an opening of the end fitting corresponding to the service position.

To be more precise, and as represented in the figures, said end fitting 5 includes a body 41 configured with at least one window or deformation 45 and said pin 47 shows in said window or deformation 45 or is placed therein when the service position and/or said working position is reached.

The pin 47 is advantageously slidably mounted in said window or deformation and therefore guides the movement of the hydraulic and/or electrical connector 11 from the working position to said service position.

In the case of deformations 45 in the body (FIGS. 9 to 11), the deformations are advantageously closed and the pin is protected from soiling, notably from icing, that could impede the movement of the wiper in the arm.

The pin may be replaced by a rib 47 as seen in FIG. 11. In this embodiment, the end fitting 5 includes two interior deformations 45 symmetrical with each other relative to a longitudinal median plane P of the end fitting. Each of the deformations 45 is formed on a lateral wall 49 of the body 41 and receives two ribs 47 of the connection interface that slide on its longitudinal sides 50. This deformation includes an external enlargement 52 at each of its lower ends forming an abutment for said ribs. In other words, in this embodiment the service position may be obtained by moving to an indexed position the interface corresponding to said abutment of the ribs on the enlargements and/or by self-guidance, in particular self-centring of the interface in the end fitting, by means of a guide part 54 of the mechanical connector described later. The same possibilities exist in the embodiments of FIGS. 3 to 5 and 10 in which the pin 47 slides in a window or deformation 45.

Said pin may be configured to allow rotation of the wiper relative to the arm in said working position up to an angle of the wiper relative to the arm equal to approximately plus or minus 15° from the null angle at which the wiper is parallel to the axis d, advantageously 12° and more particularly 10° from the null angle.

Figure 10:
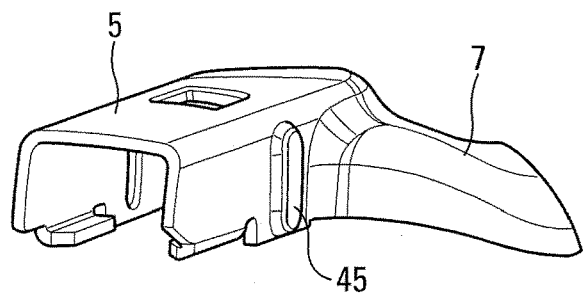

Said window or deformation 45 and said pin 47 may have complementary shapes, for example a shape like part of a bean as in the first embodiment and that of FIG. 10, notably a circular arc shape, which enables guidance of rotation of said hydraulic and/or electrical connector 11 in said arm or the wiper relative to the arm.

For example, said window or deformation 45 is produced on a lateral portion of the body 41 of the end fitting, for example by cutting or by open or closed pressing of a wall 49 of the body of the end fitting.

Said assembly 1 preferably includes two opposite windows or deformations 45 each on a lateral portion of the body of the end fitting and symmetrical with each other with respect to a longitudinal median plane P of the end fitting. The same applies to the hydraulic and/or electrical connector 11, the two lateral pins 47 of which are symmetrical with each other with respect to a longitudinal median plane P' of the interface.

Said window(s) or deformation(s) 45 may also include an opening 55 adapted to receive and to retain said pin 47 in the service position or orientation when extracting the wiper, as represented in the second embodiment in FIG. 7 or in FIG. 9. Such an embodiment also facilitates connecting the wiper to the arm as seen more particularly in FIG. 8.

Said opening 55 may be at one end of said bean-shape, transversely to a line extending the bean-shape at its lower end, in particular radially. This opening 55 is conformed to retain the pin 47 during placement in the service position and subsequent extraction of the wiper in the direction of the arrow in FIG. 7. In this case, the pin is locked in the service position.

Figure 12:
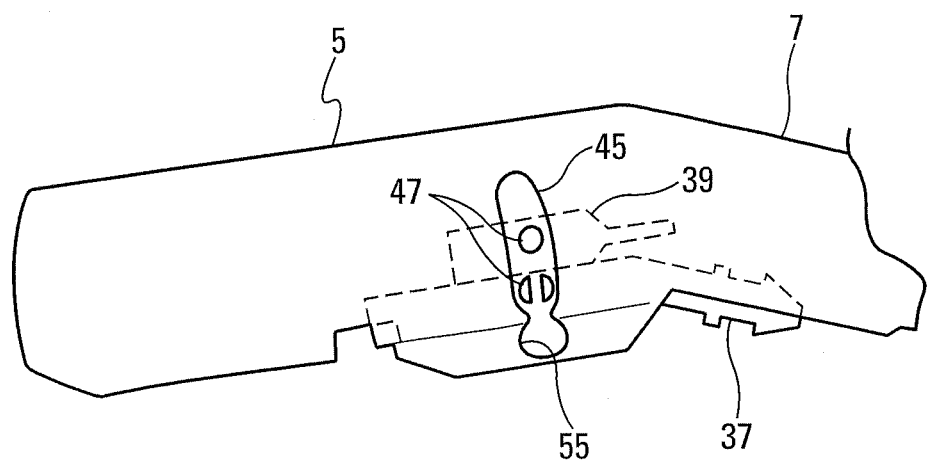
FIG. 12 is a view in elevation, without the mechanical connector, of a connection device of a vehicle windscreen wiping system in accordance with a further embodiment of the invention.

In the FIG. 12 embodiment, the opening 55 is an extension of the rest of the window 45. Here it is adapted to receive said projection 47 and to retain it, notably to clip it, in the service position. This opening, which is at the bottom of the window, receives a projection 47 in the form of a split pin, which confers greater elasticity for clipping and unclipping it and facilitates the manoeuvre. Here said projection includes two projecting elements, a first pin 47 on the hydraulic connector 37 and a second pin 47 on the electrical connector 39, which guarantees the position of the connection interface in the arm head and prevents it pivoting in the arm head about the projection axis, if there were only one of them. It may moreover be noted that doubling up the pins 47 in this way has the same advantage as in the other embodiments.

It will be noted that in the preceding embodiments, in the working position, the hydraulic and/or electrical connector 11 could be carried by said mechanical connector 15, in particular by clipping them to each other.

Said end fitting 5 is advantageously configured to allow said service position in an extreme position of the connection interface 11, notably at a maximum angle of the connection interface relative to the end fitting (see FIGS. 4 and 6). This angular position could correspond to a minimum angular position between the arm and the wiper for demounting, defined by a safety part 56 of the wiping system. This safety part 56 is intended to prevent withdrawal of the brush from the end fitting or the arm in the working position, notably if the tongue carrying said locking button 23 for locking the wiper to the arm should break.

Said safety part 56 is triangular in shape and located on the mechanical connector 15, upstanding facing said end fitting 5 to bear against the latter, at its base.

Said end fitting is further advantageously configured to allow the end fitting 5 and said interface 11 to be moved to the service position when they are not in said service position so that rotation of the wiper 9 relative to the arm 7 is allowed in the working position.

Said movement to the service position is obtained by movement of the wiper 9 relative to said arm 7, allowing for said safety part 56 if present in the wiping system.

As already mentioned above, said hydraulic and/or electrical connector 11 may moreover be configured so that at least one of its spigots or terminals 51, 40 is received by one of said connection guide parts 54, for example of funnel shape, here fastened to the mechanical connector 15 (FIG. 5). This part 54 guides and receives said spigots or terminals 51, 40 when making the connection and therefore orients the hydraulic and/or electrical connector 11 for its connection into the mechanical connector 15 with the required orientation.

The movement to the service position is then advantageously achieved by the guide part 54 in a position of the hydraulic and/or electrical connector 11 parallel to or close to the direction d of the longitudinal axis of the end fitting, i.e. when the end fitting 5 and the spigots or terminals 51, 40 of the hydraulic and/or electrical connector are disposed in said longitudinal direction d of the end fitting.

The operation of the connection devices is described next.

To change a wiper, it suffices to place the hydraulic and/or electrical connector 11 in the service position relative to the end fitting 5, for example by turning the wiper 9 relative to the arm 7, as represented in FIG. 4. Once placement in the service position has been done, the locking button 23 of the adapter may be depressed as represented in FIG. 6 and the adapter 13 and therefore the wiper 9 that is fixed to it may be extracted from the end fitting 5 by movement in translation (FIG. 7).

The connection on replacing the wiper 9 with another one is effected by a movement that is the reverse of the preceding movement, the button 23 being locked at the end of insertion of the adapter 13 in the end fitting 5 and therefore of the wiper in the arm. The wiper 9 can then be turned relative to the arm 7 and the connection interface is guided into said end fitting and remains there until the next change.

Connection/disconnection by means of the guide part 54 is automatically oriented and effected by guiding the connection interface 11 into the service position on the mechanical connector 15 when engaging the wiper in the arm head, the wiper being locked to the arm on completion of this engagement. Disconnection is effected by a manoeuvre that is the reverse of the preceding manoeuvre after unlocking the adapter from the end fitting.

The invention therefore provides the possibility of easy replacement of a wiper by another one in equipment for wiping the windows of motor vehicles including wipers produced in the so-called "flat blade" form.

The invention claimed is:

1. An assembly for a motor vehicle windscreen wiping system comprising:
    an end fitting directly attached to a wiper arm that is adapted to move a wiper; and
    a connection interface housed in the end fitting, wherein:
        said end fitting is configured to accept an adapter allowing rotation between said wiper arm and the wiper,
        said assembly is adapted to occupy a working position in which said connection interface is free relative to said end fitting and a service position in which said connection interface is oriented relative to said end fitting,
        said end fitting is configured to guide said connection interface in the working position and in the service position,
        said end fitting includes at least one window to guide movement of at least one projection disposed on the connection interface,
        the window is a through-hole in the end fitting, and
        said end fitting is configured to show said projection in said window in the service position or in said working position.

2. The assembly according to claim 1, wherein said connection interface is visible through the end fitting in the service position or in the working position.

3. The assembly according to claim 1, wherein said connection interface is abutted on the end fitting in said service position.

4. The assembly according to claim 1, wherein said connection interface is kept oriented by said end fitting in said service position.

5. The assembly according to claim 1, wherein a body of the end fitting is configured so that said projection is accommodated in said window and guides the movement of the connection interface from the working position to said service position.

6. The assembly according to claim 1, wherein said projection takes the form of a pin or rib.

7. The assembly according to claim 1, further comprising two opposed windows each formed on a lateral portion of a body of the end fitting and symmetrical with each other with respect to a longitudinal median plane P of the end fitting.

8. The assembly according to claim 1, wherein said end fitting is configured to allow said service position in an extreme position of the connection interface, notably at a maximum angle of the connection interface relative to the end fitting, retained by a safety part of the wiping system and adapted to prevent withdrawal of the wiper from the end fitting in the working position.

9. The assembly according to claim 1, wherein said end fitting is configured to allow said service position in a position of the connection interface parallel to or close to a direction d of a longitudinal axis of the end fitting.

10. The assembly according to claim 1, wherein said connection interface is configured so that in the service position at least one of spigots or terminals of said connection interface is received by a connection guide part of the wiping system.

11. A connection device of a vehicle windscreen wiping system, comprising:
    a mechanical connector adapted to be fixed to a wiper to attach the wiper to a wiper arm; and
    an adapter adapted to be articulated on said mechanical connector to allow rotation between the wiper and the wiper arm, said adapter being further inserted in an end fitting of an assembly comprising:
    the end fitting directly attached to the wiper arm that is adapted to move the wiper; and
    a connection interface housed in the end fitting, wherein:
        said end fitting is configured to accept the adapter allowing rotation between said wiper arm and the wiper,
        said assembly is adapted to occupy a working position in which said connection interface is free relative to said end fitting and a service position in which said connection interface is oriented relative to said end fitting,
        said end fitting is configured to guide said connection interface in the working position and in the service position,
        said end fitting includes at least one window to guide movement of at least one projection disposed on the connection interface,
        the window is a through-hole in the end fitting, and
        said end fitting is configured to show said projection in said window in the service position or in said working position.

12. The connection device according to claim 11, wherein said mechanical connector is configured to allow hydraulic or electrical connection of the wiper to the connection interface.

13. The connection device according to claim 11, wherein said mechanical connector is adapted to support the connection interface in the working position.

14. The connection device according to claim 11, wherein said mechanical connector includes a connection guide part for guiding the connection interface relative to the end fitting with the required orientation.

* * * * *

UNITED STATES PATENT AND TRADEMARK OFFICE
CERTIFICATE OF CORRECTION

PATENT NO. : 10,183,652 B2
APPLICATION NO. : 14/276642
DATED : January 22, 2019
INVENTOR(S) : Giuseppe Grasso et al.

Page 1 of 1

It is certified that error appears in the above-identified patent and that said Letters Patent is hereby corrected as shown below:

On the Title Page

At item (73) Assignee, the word "Systàmes" should read -- Systèmes --.

Signed and Sealed this
Seventh Day of May, 2019

Andrei Iancu
*Director of the United States Patent and Trademark Office*